March 13, 1945.  H. W. WALLACE  2,371,368
VEHICLE
Filed Oct. 16, 1942   5 Sheets-Sheet 1
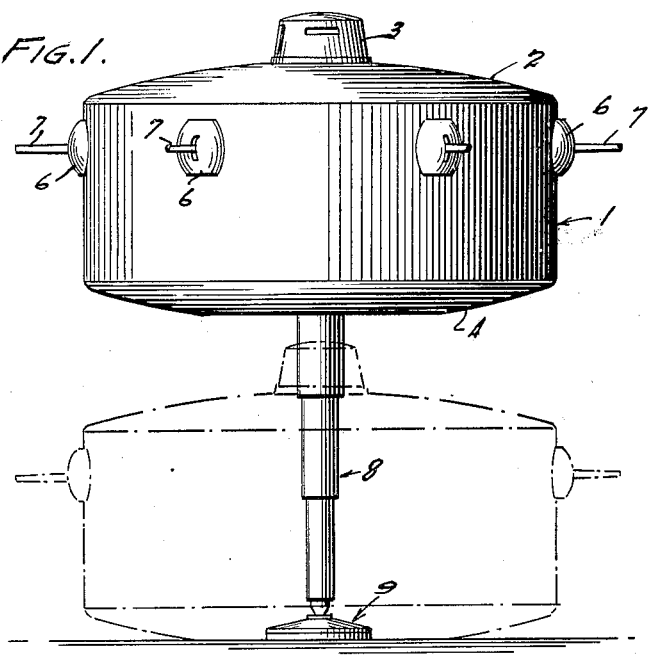
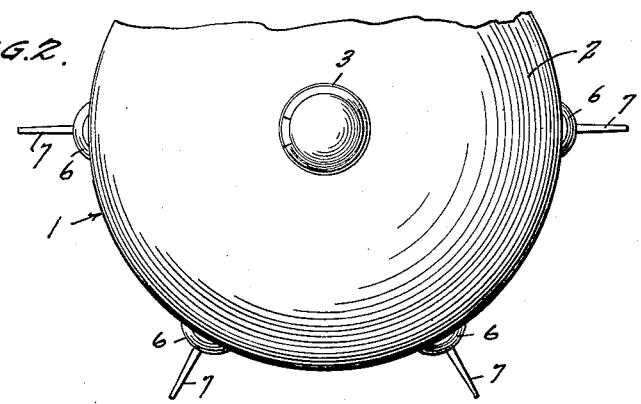
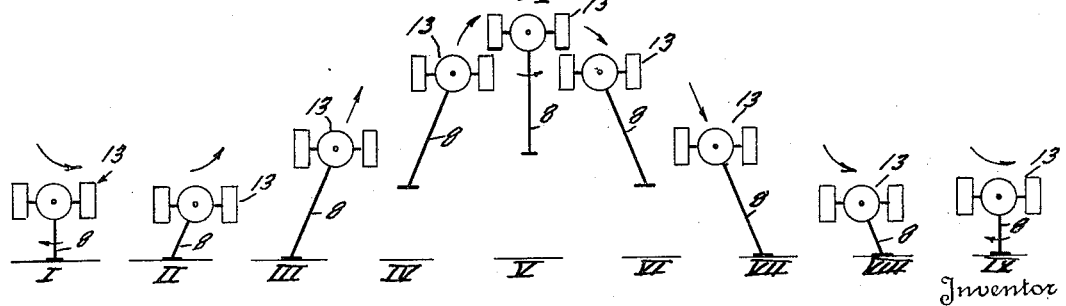
Inventor
HENRY W. WALLACE
By Semmes, Keegin, Beale & Semmes
Attorneys March 13, 1945.   H. W. WALLACE   2,371,368
VEHICLE
Filed Oct. 16, 1942   5 Sheets-Sheet 2
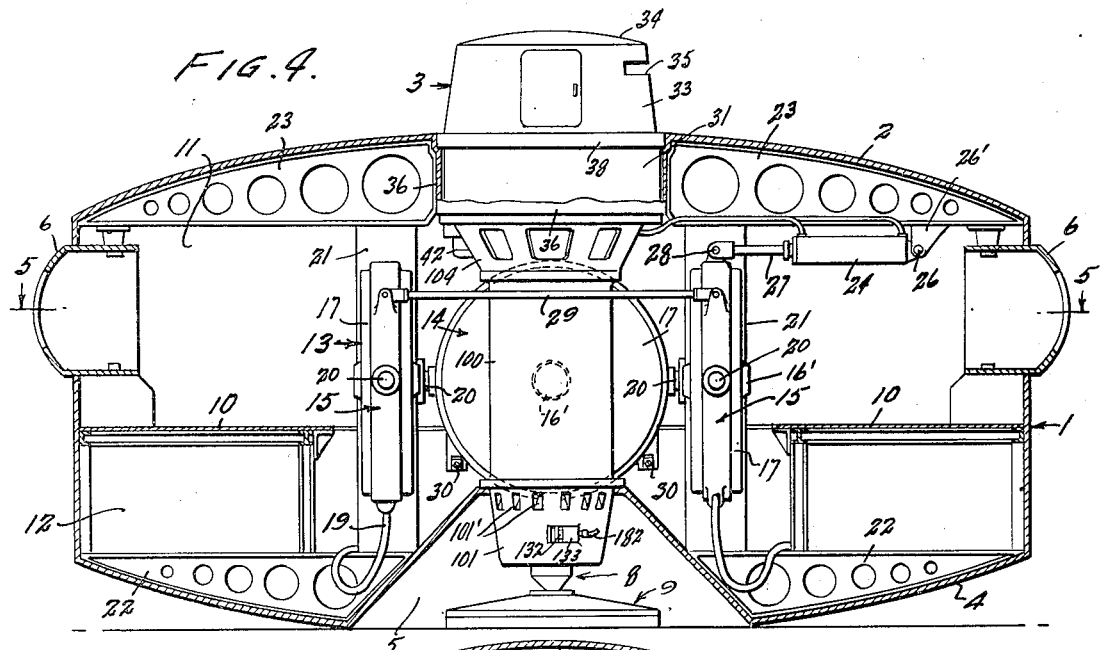
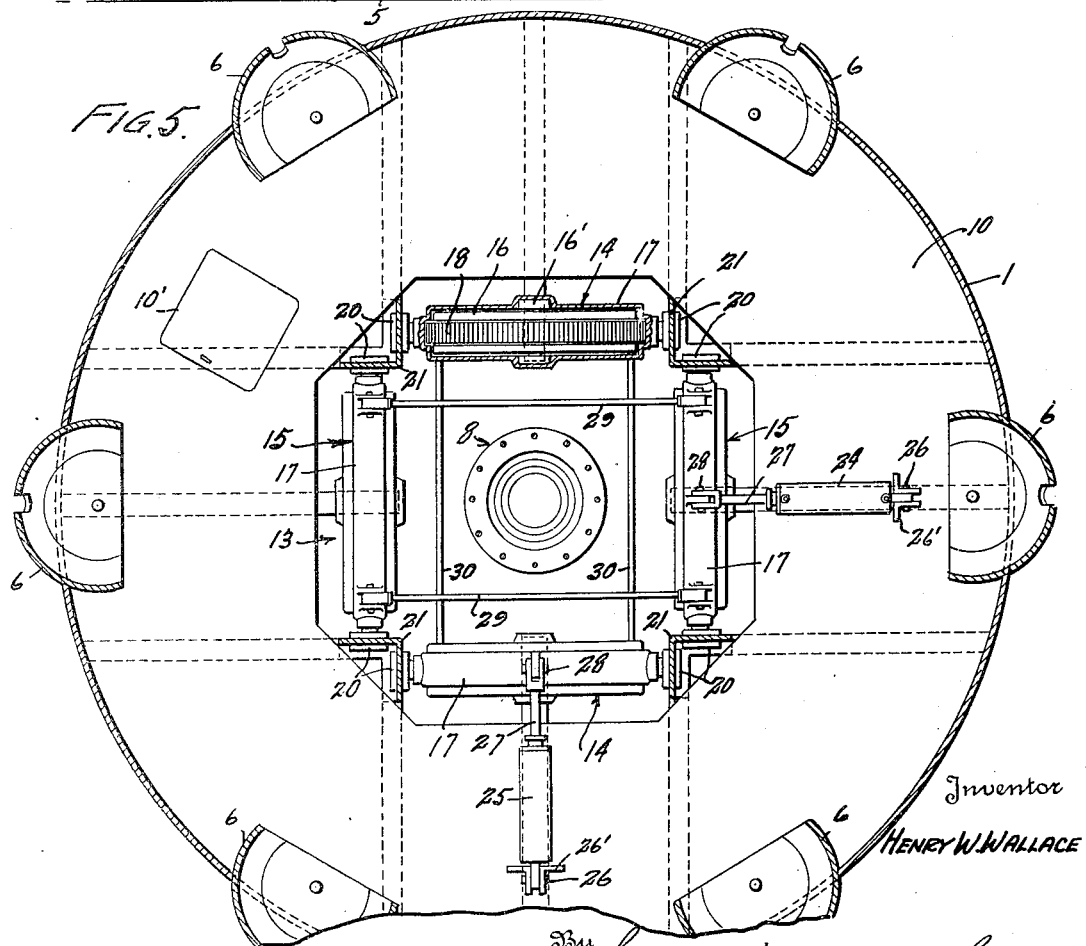
Inventor
HENRY W. WALLACE
By Semmes, Keegin, Beale & Semmes
Attorneys

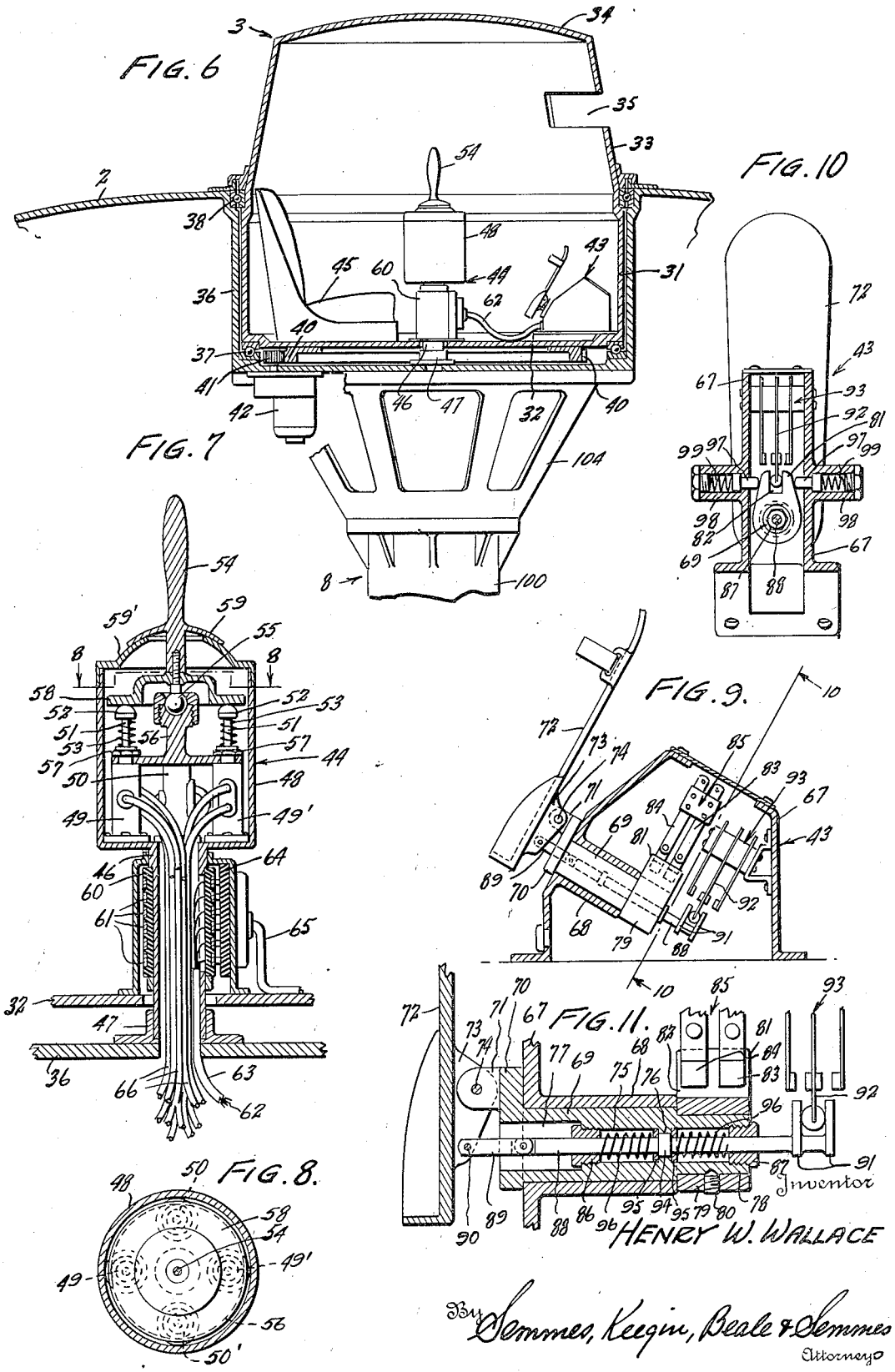

March 13, 1945.  H. W. WALLACE  2,371,368
VEHICLE
Filed Oct. 16, 1942  5 Sheets-Sheet 4
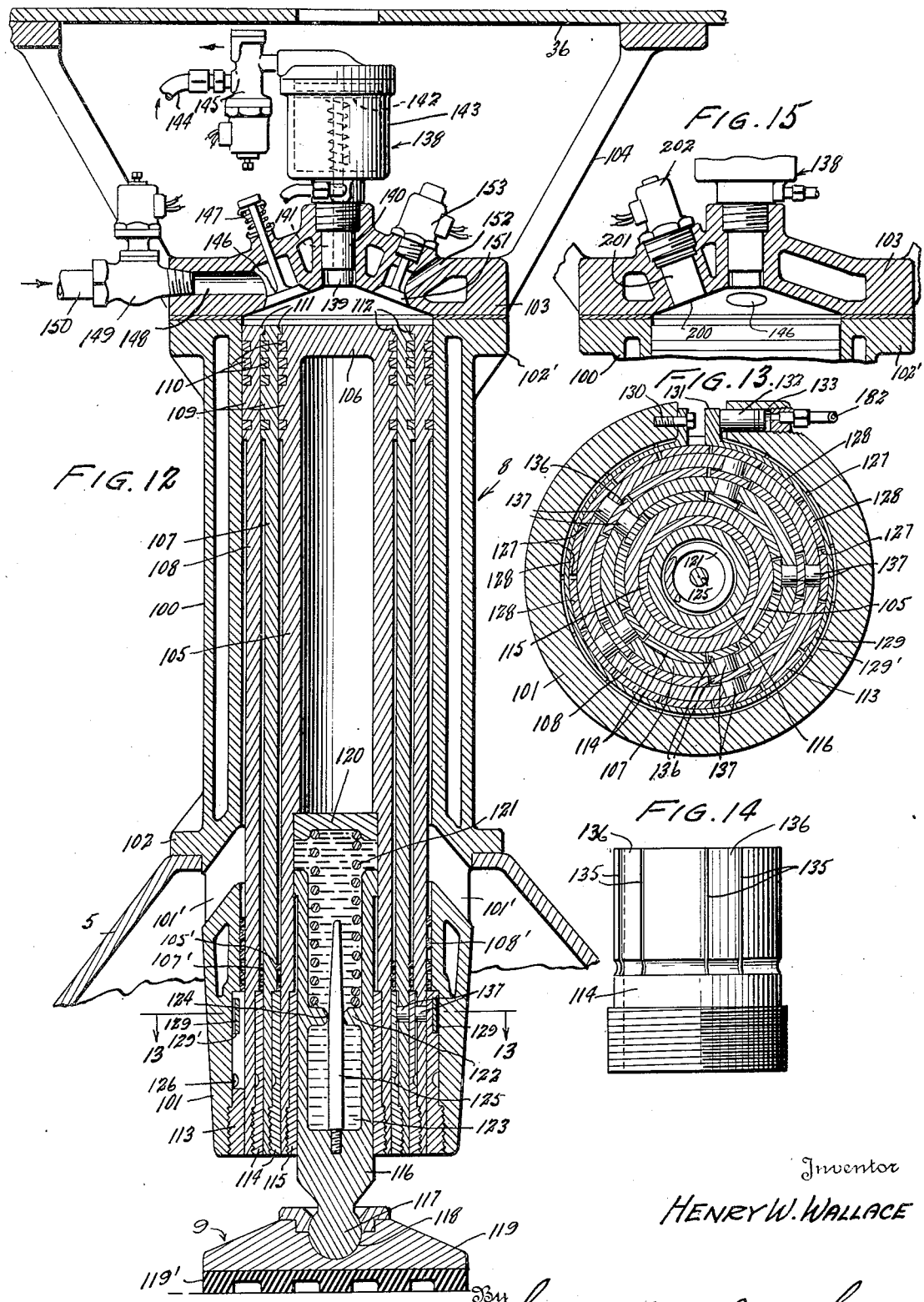
Inventor
HENRY W. WALLACE
By Semmes, Keegin, Beale & Semmes
Attorneys

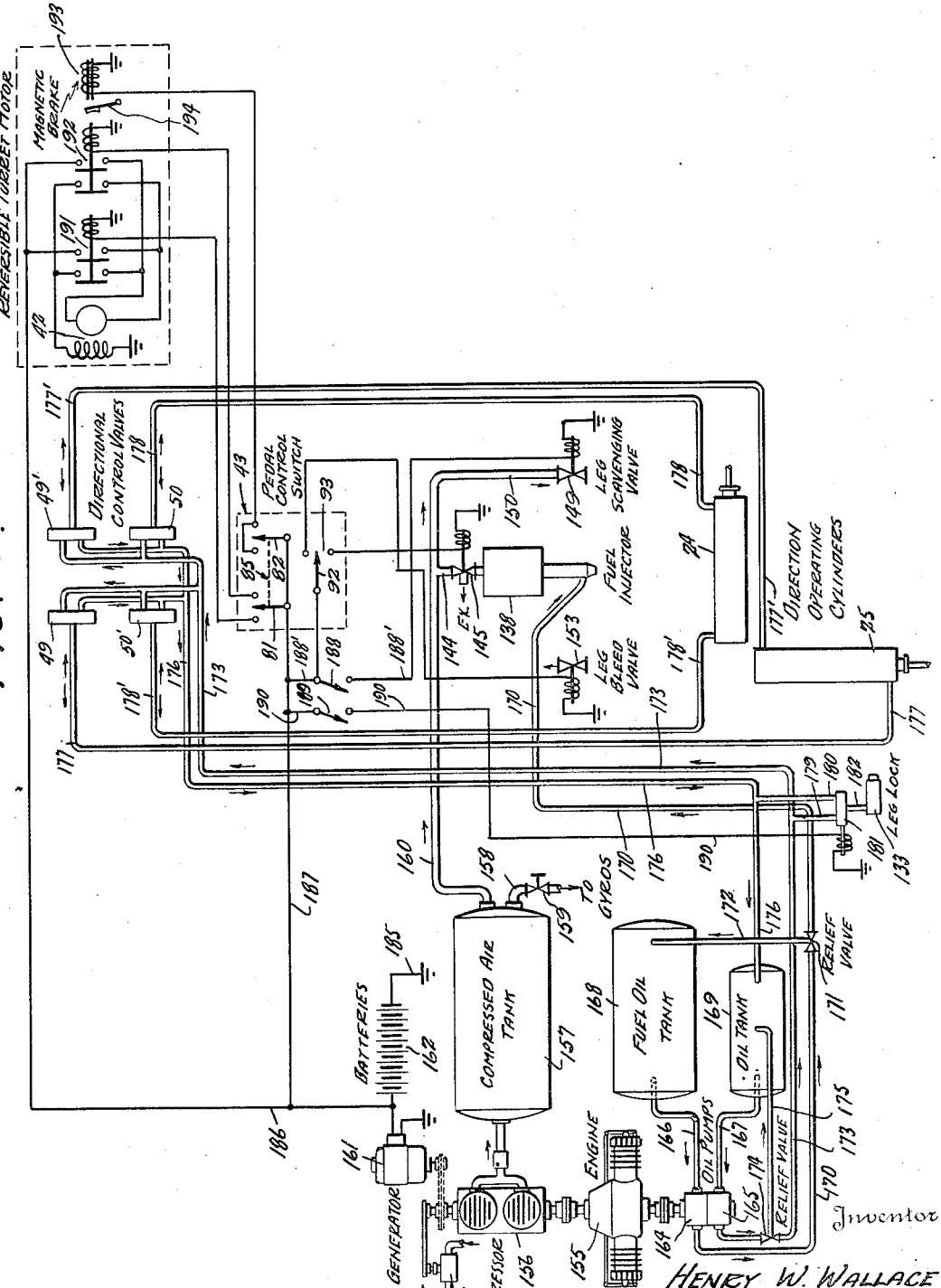

Patented Mar. 13, 1945

2,371,368

UNITED STATES PATENT OFFICE 2,371,368

VEHICLE

Henry W. Wallace, Freeport, N. Y.

Application October 16, 1942, Serial No. 462,310

11 Claims. (Cl. 180—8)

This invention relates to a vehicle, and more particularly to a tank which is propelled by means of an operating leg.

One of the objects of this invention is to provide a tank having an extensible leg capable of imparting a series of vertical oscillations to the tank, and having means to vary the angle of inclination of the leg to obtain directional movement of the tank.

Another of the objects of the invention is to provide a tank which is adapted to traverse difficult terrain.

Yet another object of the invention is to provide a tank which is propelled in such a manner that its progress is intermittent, thereby rendering it a difficult target.

Still another object is to provide a tank provided with means whereby the direction of its course may be rapidly changed, thereby rendering it a difficult target.

Yet another object is to provide a tank which provides an improved mount from which to aim a gun due to its mode of progress.

Yet another object is to provide a tank which provides the means whereby the direction of vision of each gunner remains approximately the same.

A further object is to provide a tank which, when at rest, affords adequate protection for the propelling mechanism, thereby permitting its use as a pill box.

With these and other objects in view, this invention embraces broadly the concept of providing a tank which is propelled by means of a collapsible leg. When in collapsed position the leg is fully protected by the wall of the tank, thereby permitting the use of the device as a pill box without exposing the operating mechanism.

The leg is fully extended to operating position by means of an expansible force, such as compressed air or an explosive charge. During its travel, the tank is stabilized by the action of a gyroscope.

The tank is propelled by the bounding effect imparted by the reciprocable movement of a ground engaging element which is nested in the leg. This movement is effected by the combustion of fuel oil within the leg on a Diesel principle. This operation is controlled from a pilot's turret.

In the drawings:

Figure 1 is a side elevational view of a tank showing in full lines the extended position of the operating leg and in the dotted lines the tank resting on the ground.

Figure 2 is a fragmental plan view of the tank.

Figure 3 is a diagrammatic representation of the movement of the tank.

Figure 4 is a transverse cross-sectional view, partly in elevation, of the tank showing the leg in collapsed position.

Figure 5 is a horizontal sectional view taken along the line 5—5 of the Figure 4 looking in the direction of the arrows.

Figure 6 is a transverse sectional view of the pilot's turret.

Figure 7 is a transverse sectional view of the control column.

Figure 8 is a cross-sectional view taken along the line 8—8 of the Figure 7 looking in the direction of the arrows.

Figure 9 is a detailed sectional view, partly in elevation, of the control pedal.

Figure 10 is a sectional view taken along the line 10—10 of Figure 9.

Figure 11 is a transverse cross-sectional view taken along the axis of the pedal spindle which is shown in elevation in Figure 9.

Figure 12 is a transverse sectional view of the operating leg.

Figure 13 is a cross-sectional view taken along the line 13—13 of Figure 12 looking in the direction of the arrows.

Figure 14 is a detail elevational view of one of the leg bushings.

Figure 15 is a fragmental sectional view of the leg cylinder head showing modified means for initially extending the leg.

Figure 16 is a diagrammatic view showing the piping, electrical connections and their associated parts.

Referring to the drawings, the tank comprises a cylindrical body portion 1 having a domed roof 2 in which is mounted for rotation a turret 3. The bottom 4 of the body is likewise spherical and is provided with a centrally located well 5, as best shown in Figure 4. Arranged around the periphery of the body portion 1 are a plurality of pivoted gun turrets or blisters 6 through which extend guns 7. Projecting axially downward from the body 1 is an extensible operating leg designated generally as 3 which is provided with a universally pivoted foot 9.

Referring to Figure 4 there is shown a raised floor 10 which divides the body into superposed compartments 11 and 12. The compartment 11 is adapted to provide space for the gunners, ammunition magazines, etc., while the space 12 is utilized for the operating mechanism for the tank. In order to simplify the drawings, the operating mechanism has not been shown in Figure 4 but is shown diagrammatically in Figure 16.

A gyroscopic stabilizing device indicated generally as 13 is positioned within the body 1 substantially about the center of gravity of the body. This stabilizer comprises two pairs of gyroscopes 14 and 15. The pair of gyroscopes 14 are mounted to revolve in opposite directions in parallel planes which are angularly adjustable with respect to the axis of the compression leg 8 while the pair of gyroscopes 15 are mounted to revolve in opposite directions in parallel planes arranged at right angles to the planes of revolution of the gyroscopes 14. The planes of revolution of the gyroscopes 15 are also adjustable with respect to the axis of the compression leg 8 while maintaining their parallel relation to each other. Each of the individual gyroscopes 14 and 15 include a wheel 16 journaled in bearings 16' within a casing 17. This arrangement of the four gyroscopes is to prevent precession when stress is placed upon the gyroscopes' axes and to maintain the tank against revolution about the axis of the compression leg.

The wheels 16 are provided with turbine blades 18 which coact with a source of compressed air indicated at 19 to impart motion to the wheels. Each casing 17 is journaled for pivotal movement in bearings 20 about a horizontal axis at right angles to the axis 16'. The bearings 20 are carried in angular up-right posts 21 positioned between floor and ceiling beams 22 and 23, respectively, which form a part of the body structure.

To provide for relative movement between the body 1 and the stabilizer 13. one of each of the pairs of gyroscopes 14 and 15 is operatively connected with the body by means of hydraulic cylinders 24 and 25, respectively. The head end of each of these cylinders 24 and 25 is pivotally attached, as shown at 26, to a bracket 26' which is in turn connected to one of the ceiling beams 23. The piston rod 27 extends through the opposite end of each of these cylinders and is pivotally connected, as shown at 28, to the periphery of the gyroscope housing 17. Tie rods 29 and 30 are provided to operatively connect diametrically opposite gyroscopes, as shown in Figures 4 and 5.

The pilot's turret 3. as best shown in Figure 6, comprises a lower cylindrical portion 31 provided with a floor 32 and a frusto-conical upper portion 33 which extends above the roof 2 and is provided with a domed roof 34 and an observation slot 35. The turret 3 is mounted for rotation in a well 36 provided centrally in the upper surface 2 of the body in antifrictional bearings, located as shown at 37 and 38. Attached beneath the floor 32 concentrically with the turret 3 is a ring gear 40 which meshes with a pinion 41 driven by a geared motor 42 for imparting rotary movement to the turret. The control of this movement is effected by means of a control pedal of which there may be a duplicated dummy, indicated generally as 43, and which will be described in more detail later. Also located centrally within the turret is a control column 44 for controlling the directional movement of the tank and a pilot's seat 45 diametrically aligned with the pedal unit 43 on the opposite side of the control column 44.

The control column 44, as best shown in Figure 7, comprises a tubular pedestal 46 attached by means of a flanged fitting 47 to the bottom wall of the well 36. The upper portion of the pedestal 46 is enlarged, as shown at 48, and has attached therein operating valves 49, 49' and 50, 50'. These valves are three-way piston-type valves and are provided with upwardly extending stems 51 having semispherical heads 52. Disposed between the heads 52 and the body portion of the valves are helical springs 53 which normally tend to force the heads upward.

An operating handle 54 is universally attached by means of a ball and socket joint 55 to a flanged support 56 securely attached, as shown at 57, to the valves. The handle 54 is provided with a circular flange 58 which is adapted to engage the heads 52 of each of the valves in such a manner that when the handle is in its vertical position, as shown in Figure 7, all of these valves are adapted to be in their closed position. Angular displacement of the handle 54, however, will cause one of the stems 51 to be depressed and the diametrically opposite stem to be extended to cause a flow of hydraulic fluid through the valves in a manner which will be described later. An arcuate flange 59 is provided on the handle 54 cooperating with a dome cover 59' to provide a dust-free enclosure for the valve mechanism.

In order to provide for electrical connection between apparatus respectively located in the body of the tank and the rotating turret, I provide a distributor 60 provided with contact rings 61. The distributor 60 is insulated from the pedestal 46 and rotates therewith. Each of the rings 61 has connected thereto a conductor 62 which conductors are gathered to form a cable 63 extending from the column 44 through the well 36 and into the interior of the body 1. Each of the rings 61 is adapted to engage a brush 64. Each of these brushes 64 is electrically connected by means of conductors 65 to the electrical control apparatus located in the turret 3. Hydraulic fluid from its source of supply is conducted through conduits 66 which extend through the column 44 to the valves mounted therein and from these valves back through the column 44 to the operating cylinders 24 and 25.

Referring now to Figure 9 which illustrates the control pedal apparatus, I have shown a casing 67 attached to the floor 32 of the turret 3 and which is provided with a bearing sleeve 68. Mounted in the sleeve 78 for rotary movement is a spindle 69 provided with a flanged outer end 70 having a peripheral eye member 71. A pedal 72 having a bifurcated extension 73 on its lower surface is pivotally attached to the eye member 71, as shown at 74.

Spindle 69 is centrally step bored, as shown at 75, to provide an internal flange 76 and enlarged portion 77 adjacent the outwardly extended end thereof. The outer diameter of the spindle 69 is reduced at its inner end, as indicated at 78, which reduced portion is provided with a collar 79 to affix the spindle against longitudinal movement. The collar 79 is provided with a set screw 80 by means of which it is attached to the spindle and has a radial extension 81 in which is machined a slot 82 for the reception of the switch arms 83 and 84 of a double-pole double-throw switch 84. From the above it will be seen that rotary movement of the spindle 69 caused by the pedal 72 will actuate the switch 85. This switch 85, as will be later described, will cause rotary movement of the turret 3 in either direction by controlling the forward and reverse operation of the motor 42. For example, swiveling of the pedal to the right, as facing the pedal from the pilot's seat 45, will cause a clockwise rotation of the turret, while swiveling the pedal to the left will cause a counter-clockwise movement.

Mounted for reciprocating movement in reducing bushings 86 and 87 provided in the bore 75 is a rod 88 provided with a hinged extension 89 which is pivotally attached at 90 to the bifurcated extension 73 of the pedal 72. The inner extremity of the rod 88 carries spaced segments 91 between which is engaged the end of the switch-on 92 of a single-pole double-throw switch 93. This switch 93 is adapted to control the operation of the leg 8 in a manner to be hereinafter set forth.

To assure a neutral or "off" position of the switches 85 and 93, I provide centering means for the pedal 72. The centering means for the pivotal or up and down movement of the pedal 72 are best shown in Figure 11. These means comprise a flange 94 intermediate the ends of the rod 88 which, when the pedal is in its neutral position, lies within the internal flange 76. On either side of the flange 94 is a collar 95 of greater diameter than the diameter of the flange 94, and a compression spring 96 is positioned between each one of these washers 95 and the bushings 86 and 87. To center the swiveling or right and left movement of the pedal 72, I provide a flanged plunger 97 slidable in a well 98 formed in each side of the casing 67. These plungers are loaded by means of springs 99 and are adapted to engage each side of the radial extension 81 of the collar 79. This structure is best shown in Figure 10.

The operating leg 8 may be constructed as shown in Figure 12 where the numeral 100 represents the water jacketed cylinder which is mounted centrally of the body 1 having an extension 101 projecting into the conical well 5. The cylinder 100 is externally flanged at 102 for attachment to the body or to the shell 1 and is likewise flanged at its upper extremity 102' where it is attached to a cylinder head 103 provided with a cutaway frusto-conical flange 104 which is, in turn, attached to the bottom surface of the well 36. Mounted to reciprocate in the cylinder 100 is a telescoping piston comprising an inner sleeve 105 closed at its upper ends as shown at 106. Between the sleeve 105 and the inner wall of the cylinder 100 are a pair of intermediate sleeves 107 and 108. The upper extremities of the sleeves 105, 107 and 108 are slightly externally flanged as shown at 109 and provided with piston rings 110. Each of the sleeves 108 and 107 are provided at their upper extremities with internal flanges 111 which mate, respectively, with peripheral grooves 112 in the upper extremities of the sleeves 107 and 105 when the leg is in its collapsed position.

Secured in the bottom of the cylinder 100 is a bushing 113 for anti-frictional engagement of the sleeve 108 with the cylinder. Similar bushings 114 are provided in the lower extremities of each of the sleeves 107 and 108, while a bushing 115 is secured in the bottom of the sleeve 105. Each of these bushings 113—115 has an inside diameter slightly less than the outside diameter of the cylinder into which it fits to provide shoulders co-acting with the bottoms of the flanges 109 to limit the extensible movement of the leg.

Located between the leg-portion cylinders 105, 107 and 108 and the water jacketed cylinder 100 are shock-absorber coil springs 105' and 103' and combination shock-absorber port-valve regulator coil spring 108'. These springs are secured in place by means of bushings 114 and bushing 113. The function of coil spring 108' will be described later in the description of the function of the tank.

A hollow piston 116 having a ball 117 formed on its end is slidably mounted in the lower end of the bore of the sleeve 105. The ball 117 is retained in a socket 118 by means of an annular cap 118' to provide a universal connection of the piston 116 with a foot member 119 which has a resilient pad 119' secured to the bottom thereof to provide a frictional ground engaging surface for the foot. Interpositioned in the bore of the sleeve 105, intermediate its ends, is a partition 120 to form in the lower end of the bore a hydraulic cylinder for the piston member 116. The partition 120 also serves as a seat for one end of a helical shock absorbing spring 121, the opposite end of which bears against an internal flange 122 formed in the bore of the hollow piston 116 to normally force the piston outwardly from the sleeve 105. The hydraulic cylinder is filled with a liquid 123 which is controllably bled through an orifice 124 formed by the flange 122 by means of a metering pin 125 to dampen the movement of the piston 116.

To provide means for locking the leg 8 in its collapsed position, the following structure is provided. The bushing 113 is peripherally grooved, as shown at 126, intermediate its ends and is slotted, as at 127, from its upper extremity to the groove 126 to provide a plurality of longitudinal segments 128. A brakeband 129 retained in a groove 129' formed in the circumference of the bushing 113 has one of its ends secured to the cylinder 100, as shown at 130. The opposite end of the brakeband 129 is provided with a block 131 which is adapted to be engaged by a piston 132 of a hydraulic cylinder 133. By reference to Figure 13, it will be seen that actuation of this piston 132 will cause the upper portion of the bushing 113 to be restricted against the sleeve 108, thereby locking it against movement with respect to the cylinder 100. In order to provide this locking action also for the sleeves 107 and 105, the bushings 114 are likewise peripherally grooved, as shown at 134, and are also longitudinally slotted at 135 to form resilient segments 136. Push pins 137 are slidably mounted in radial apertures formed in the sleeves 107 and 108 to register with the upper ends of the resilient segments 136 of the bushings 114 and also with segments 128 of the bushing 113. By means of this structure, constricting movement of the bushing 113 will be transmitted to the resilient segments 136 of the bushings 114 to clamp the sleeves 107 and 105 in the collapsed position.

The cylinder head 103 is provided with a fuel injector pump designated generally as 138. This pump comprises an atomizing nozzle 139 and a fuel cylinder 140 in which is mounted a piston 141. The piston 141 terminates at its upper extremity in a second piston of substantially larger diameter which is operatively contained in a pneumatic cylinder 143 adapted to be supplied with compressed air through a line 144 controlled by a three-way solenoid operated valve 145. A scavenging valve 146 loaded by means of a spring 147 is seated in the head 103. The valve 146 is a check-type valve and provides for one-way flow through a duct 148 in which is fitted a solenoid valve 149 for controlling the flow of scavenging air from a line 150 into the cylinder 100. This solenoid valve is so constructed that it is at rest either opened or closed. The cylinder head 103 also is provided with a normally closed bleed valve 151 which is adapted to close an exhaust orifice 152. Opening of the valve 151 is effected by means of a solenoid mechanism 153.

Operation of the leg 8 is by internal combustion of fuel oil on a two-cycle Diesel principle which is controlled electrically from the pilot's turret 3. Directional control of the tank is by hydraulic means changing the relative position of the tank axis to the plane of rotation of the gyroscope stabilizer as described above. Means for effecting these operations, together with the operation of the turret 3, is shown diagrammatically in Figure 16 where the numeral 155 represents an internal combustion engine whose drive shaft is coupled to an air compressor 156. The compressor 156 delivers compressed air to a tank 157 which is provided with an outlet line 158 controlled by the valve 159 to supply air for driving the pairs of gyroscopes 14 and 15. The second line 160 communicates with the tank 157 to supply compressed air for operation of the fuel pump 138 and for scavenging the cylinder 100 through the valve 149. A generator 161, adapted to charge storage batteries 162, is driven from the compressor 156 which also supplies power to drive a pump 163 for circulating cooling liquid through the jacket of the cylinder 100.

Also coupled to the shaft of the engine 155 are oil pumps 164 and 165 whose inlets are respectively connected by means of lines 166 and 167 to a fuel oil tank 168 and a tank 169 which contains fluid for operation of the hydraulic mechanisms. The delivery side of the fuel oil pump 164 is provided with a line 170 which communicates with the fuel injection pump 138. A relief valve 171 is interposed in the line 170 and provided with a bypass line 172 to return oil in excess of predetermined pressure to the tank 168.

The delivery side of the pump 165 is connected with a line 173 in which is a relief valve 174 and a return bypass line 175 leading to the tank 169. Line 173 communicates with the inlet ports of each of the control valves 49 and 49', 50 and 50' whose exhaust ports are connected with a return line 176 leading back to the supply tank 169. The valves 49 and 49' are respectively provided with conduits 177 and 177' which lead respectively to the rod and head end of the cylinder 25 while the cylinders 50 and 50' are similarly provided with conduits 178 and 178' which extend to the rod and head ends of the hydraulic cylinder 24. Connected to the delivery and return lines 173 and 176 are pipes 179 and 180 which communicate with a solenoid valve 181 which controls the delivery of hydraulic fluid through a line 182 to the brake cylinder 133.

To initiate the movement of the propulsion mechanism, I provide a chamber 200 formed in the head 103 and communicating with the cylinder 100. A series of cartridges 201 of suitable explosive is inserted in this chamber and a solenoid operated series of detonators 202 is affixed thereto as shown in Figure 15. A detonator is then actuated to fire a cartridge, the expanding gases causing the pressure within the combustion chamber to reach the flash point of the atomized fuel oil forcing the leg 8 to extend to the exhaust ports 101. This reaction is so designed that the proper proportions of air and oil vapor are present for combustion. When pressure is released, the gas is scavenged and the normal operating cycle put into operation. This enables the tank to get underway very rapidly which is an invaluable asset when acting as a pill box on the field of battle.

Electric current is supplied from the battery 162 through a ground connection 185 and leads 186 and 187 to the switch blades 81 and 82 of the d. p. d. t. switch 85 to the blade 92 of the s. p. d. t. switch 93. The lead 187 also supplies current to energize the solenoid bleed valve 153 through a switch 188 and line 188', while actuation of the solenoid brake valve 181 is controlled through a switch 189 and a lead 190 connected with the lead 187. Forward and reverse operation of the motor 42 is respectively controlled by a relay 191 and a relay 192 adapted to close circuit from the battery 162 through the lead 186 to the motor 42 and to ground. Actuation of these relays is selectively effected by energizing them through the double-pole double-throw switch 85, the switch arm 81 of which is adapted to complete the circuit through the line 187 to the windings of either of these relays 191 or 192 depending upon direction of movement of the arm 81. The arm 82 of the switch 85 is moved in synchronism with the arm 81 to supply current to energize a magnet 193 to release a brake 194 associated with the motor 42.

In operation the engine 155 is started to drive the compressor, oil pumps, gyroscopic stabilizer, etc., associated therewith, and the pilot seated in the turret 3 places his foot in the pedal 72. By closing the switch 188, the solenoid valve 149 is energized. This supplies compressed air through the scavenging valve 146 and into the cylinder 100 to initiate movement of the tank, one of the cartridges 201 is detonated and, simultaneously, fuel injected through nozzle 139 into compression chamber 100. The fuel is injected by the upward rocking of pedal 72, which closes the switch 93, energizing the solenoid valve 145 which in turn supplies compressed air to the cylinder 143 thus injecting the fuel. This fuel mixes with the heated compressed air, ignites, and extends the leg 8, the cycle of operation beginning as the leg 8 is extended, the sleeves 105, 107 and 108 move as one from the compression jacket 100 until the external flange 109 or sleeve 108 comes in contact with the combination shock-absorber portvalve regulator coil spring 108'. This regulator coil spring prevents the sleeve 108 from exposing the exhaust ports 101' due to the gas pressure acting on the sleeve's surface in a plane perpendicular to the path of movement of this sleeve with respect to the compression jacket 100, the gas pressure acting on sleeve 107 in a similar manner which is transmitted to sleeve 108 and the forces created by gravity acting on both sleeves. The regulator coil spring 108' also functions as a shock-absorber which is also the function of coil springs 107' and 105'. As the compression leg becomes fully extended, the force compressing the regulator coil spring immediately becomes great enough to allow the sleeve 108 to move to a more extended position exposing the exhaust ports 101'. The exhaust ports 101' also act as pressure release valves during different stages of the extension of leg 8. This function occurs when the pressure within the leg becomes sufficiently great to compress the regulator coil spring 108' by acting on the sleeves 108, and 108 and 107 together. As the exhaust ports 101' may not operate in the first few cycles of propulsion, the bleed valve 153 is opened by depressing pedal 72 allowing the scavenging valve 146 to operate to clear the leg of exhaust gases. This function occurs when the period of least compression is present, at which time the bleed valve 153 reduces the compression still further and the compressed air from the scavenging valve 146 displaces exhaust gases. The scavenging valve 149 operates automatically, opening whenever the pressure in the compression leg permits.

During the above cycles of firing, exhaust and compression, the tank is put into a series of gradually increasing periods of vertical oscillations, the compression of air in the cylinder, caused by the collapsing leg, effecting increasingly, a rebound which not only decelerates the falling movement of the tank but also assists the explosive energy of the fuel oil in the succeeding upward swing. As the amount of the oscillations increases, the whole tank leaves the ground.

During this initial movement, the gyroscopes 14 and 15 are rotating in planes parallel to the axes of the leg, thus stabilizing the tank in a vertical movement. The pilot rotates the turret 3 by swiveling the pedal 72 either to the right or left to give a forward or reverse rotation to the motor 42 and thus a right or left rotation of the turret until he is facing in the direction desired to maneuver the tank.

After this has been accomplished and at or near the upward limit of one of the oscillations, he pushes forward on the control stick 54, thereby changing the angular position of the leg rearwardly with respect to the vertical axis of the gyroscopic stabilizer. Since the center of gravity of the tank is now somewhat forward (in the direction of travel) of the foot 119, the tank will tend to tilt angularly forward when the leg next comes in contact with the ground. During this period, while the leg is in contact with the ground, the pilot resets the gyroscopic stabilizer which has slipped while exerting the force necessary to change the angular position of the leg while at the top of its preceding trajectory. This is accomplished by pulling back on the control stick 54. The angle of the leg 8 being disposed rearwardly from the vertical, the next rebound and firing stroke will impart a forward and upward movement to the tank, as shown in diagrams II, III and IV of Figure 3.

As the tank approaches the top of its trajectory, as illustrated in diagrams IV, V and VI of Figure 3, the operator changes the axis of the leg angularly forward by moving the control stick towards himself. The tank completes the trajectory movement as shown in diagrams VII and VIII, the leg again contacting the earth and compressing during which time the pilot again pushes forward on the stick to again reset the gyroscopic stabilizer and at the same time assist in changing the angle of the leg as shown in diagrams IX through II to repeat the cycle. To operate the tank so that it can move in any direction, the pilot moves the control stick in any direction in such a manner that the angular position of the leg upon contacting the ground combines with the horizontal component motion of the tank to produce said direction. The pilot determines the direction of the forthcoming trajectory at the top of the preceding trajectory. It is possible for the direction of the tank's trajectory to vary as much as 180° in each succeeding cycle. This operation is continued as long as movement is desired or until the destination has been reached, at which time the bleed valve 153 is opened to relieve compression in the cylinder 100 and allow the tank to settle to the ground.

The design of the fuel injection pump is such that it gives the operator direct control over the acceleration of the tank by controlling the amount, time and period of fuel injection. In other words, if necessary to accelerate the movement of the tank, the air valve 145 may be held open for a longer period of time to cause fuel to be injected during a longer period of the firing stroke.

While only one form of gyroscope is disclosed, other types and methods of mounting may be employed to perform the same function.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A vehicle comprising a load carrying portion, a ground-engaging displacing member reciprocable toward and away from the load carrying element, power means for actuating the displacing member to impel the vehicle away from the ground, gyroscopic means to stabilize the vehicle, and means to tilt the gyroscope to control the direction of impulsion of the vehicle from the ground.

2. A vehicle comprising a body portion, an extensible leg attached to the body portion designed to support and propel the vehicle, gyroscopic means to stabilize the vehicle, and means to inject an explosive material into the said leg to form an explosive mixture with air in the leg, whereby the leg will be extended after the explosion of the mixture.

3. A vehicle comprising a body portion, an extensible leg attached to the body portion designed to support and propel the vehicle, gyroscopic means to stabilize the vehicle, means to inject fuel oil into the said leg to form an explosive mixture with air in the leg whereby the leg will be extended after explosion of the mixture, and means to regulate the amount of injected fuel.

4. A vehicle comprising a body portion, an extensible leg attached to the body portion designed to support and propel the vehicle, gyroscopic means to stabilize the vehicle, a pump to inject fuel oil into the said leg to form an explosive mixture with air in the leg whereby the leg will be extended after explosion of the mixture, and means for regulating the pump to control the amount of injected fuel.

5. A vehicle comprising a body portion, a gyroscope to stabilize the vehicle, a hollow collapsible leg attached to the body portion and designed in extended position to support the vehicle, a ground-engaging piston nested in the lower extremity of the leg, and means to inject an explosive material into the leg to form with air in the leg an explosive mixture whereby the piston will be forced outwardly after the explosion of the mixture.

6. A vehicle comprising a body portion, a gyroscope to stabilize the vehicle, a hollow collapsible leg attached to the body portion and designed in extended position to support the vehicle, a ground-engaging piston nested in the lower extremity of the leg, a pump to inject a fuel into the upper portion of the said leg to form with air in the leg an explosive mixture whereby the piston is forced outwardly after the explosion of the mixture, and means for regulating the pump to control the amount of injected fuel.

7. A vehicle comprising a body portion, a gyroscope to stabilize the vehicle, a hollow collapsible leg attached to the body portion and designed in extended position to support the vehicle, a piston nested in the lower extremity of the leg, a ground-engaging shoe attached to said piston, a pump to inject a fuel into the upper portion of the said leg to form with air in the leg an explosive mixture whereby the piston is forced outwardly after the explosion of the mixture, and means for regulating the pump to control the amount of injected fuel.

8. A vehicle comprising a body portion, a load carrying element designed to support the vehicle, a ground-engaging element mounted in the load carrying element and reciprocable toward and away from the load carrying element, power means for actuating the said element to impel the vehicle away from the ground, means within the body portion for stabilizing the vehicle, said means being formed of a plurality of diametrically opposed bodies capable of rotation in opposite directions in a horizontal plane, and means for tilting the gyroscope about an axis perpendicular to the said plane of rotation.

9. A vehicle comprising a body portion, a load carrying element designed to support the vehicle, a ground-engaging element mounted in the load carrying element and reciprocable toward and away from the load carrying element, power means for actuating the said element to impel the vehicle away from the ground, means within the body portion for stabilizing the vehicle, said means being formed of two pairs of diametrically opposed bodies, each pair of said bodies being capable of rotation in opposite directions in a horizontal plane, and means for tilting the gyroscope about an axis perpendicular to the said plane of rotation.

10. A vehicle comprising a body portion, a hollow collapsible leg attached to the body portion, a ground engaging piston nested in the extremity of the leg, means to inject a fuel into the leg to form with the air an explosive mixture whereby the piston is forced outwardly after the explosion, thereby impelling the vehicle away from the ground, a gyroscope mounted within the body portion, said gyroscope being formed of two diametrically opposed bodies capable of rotation in opposite directions in a horizontal plane, and means for tilting the gyroscope about an axis perpendicular to the said plane of rotation to control the direction of impulsion of the vehicle from the ground.

11. A vehicle comprising a body portion, a hollow collapsible leg attached to the body portion, a ground engaging piston nested in the extremity of the leg, means to inject a fuel into the leg to form with the air an explosive mixture whereby the piston is forced outwardly after the explosion, thereby impelling the vehicle away from the ground, a gyroscope mounted within the body portion, said gyroscope being formed of two pairs of diametrically opposed bodies, each pair of said bodies being capable of rotation in opposite directions in a horizontal plane, and means for tilting the gyroscope about an axis perpendicular to the said plane of rotation to control the direction of impulsion of the vehicle from the ground.

HENRY W. WALLACE.